United States Patent

[11] 3,612,454

| [72] | Inventor | Frank F. Linn<br>3049 W. 8th, Los Angeles, Calif. 90005 |
|---|---|---|
| [21] | Appl. No. | 857,009 |
| [22] | Filed | Sept. 11, 1969 |
| [45] | Patented | Oct. 12, 1971 |
| [73] | Assignee | Frank F. Linn, Jr. |

[54] FISHING ROD HOLDER
5 Claims, 7 Drawing Figs.

[52] U.S. Cl. .................................................. 248/42,
248/314, 248/44, 248/156
[51] Int. Cl. ......................................... A01k 97/10,
E04h 12/22
[50] Field of Search ................................ 248/38, 40,
42, 314

[56] References Cited
UNITED STATES PATENTS

| 1,952,789 | 3/1934 | Butts .......................... | 248/38 |
| 2,160,499 | 5/1939 | Goeb .......................... | 248/42 UX |
| 2,314,747 | 3/1943 | White .......................... | 248/42 X |
| 2,873,850 | 2/1959 | Ortegren ..................... | 248/38 X |

*Primary Examiner*—William H. Schultz
*Attorney*—Warren, Rubin, Brucker & Chickering ABSTRACT: A universally mounted resilient helix dimensioned for receipt and support of the butt of a fishing rod in combination with a quick detachable mounting means for selectively stationing the holder for and during fishing.

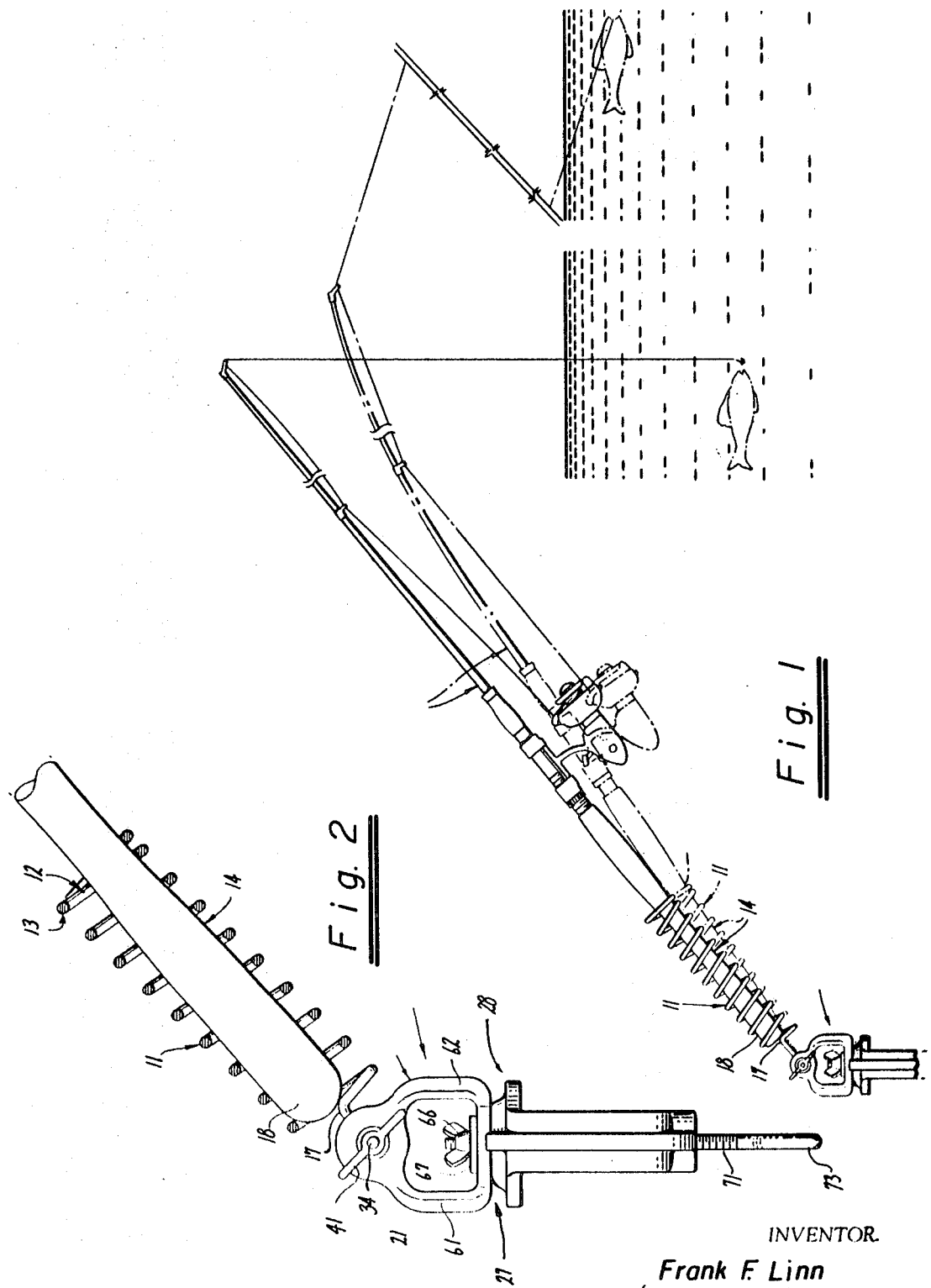

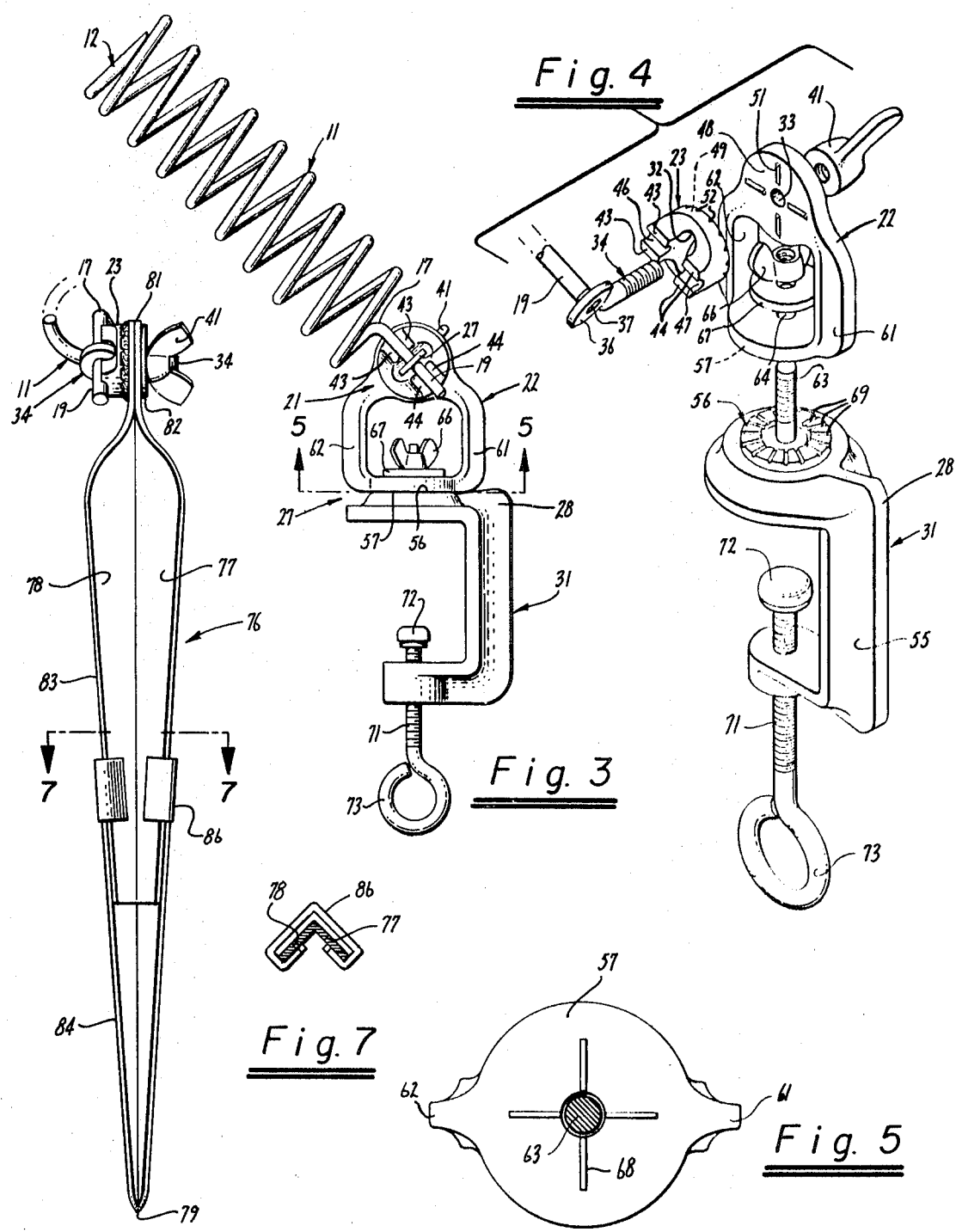

FISHING ROD HOLDER

The invention relates to devices designed for temporarily holding a fishing rod in position while fishing.

An object of the present invention is to provide a fishing rod holder of the character described which is portable and designed to be included with and to accompany the fishing gear on fishing trips; may be quickly and easily mounted in a wide variety of locations for fishing and may with equal use and facility be moved from time to time while fishing to more advantageously position the fishing rod and be removed at the conclusion of fishing; and will provide full universal orientation of the rod in each selected location for desired rod position.

Another object of the present invention is to provide a fishing rod holder of the character above which will securely hold the rod to free the fisherman during those periods of waiting for a fish to strike; will provide a resilient mounting for the rod to assist in setting the hook on a strike; and will permit quick and easy withdrawal of the rod from the holder to permit the playing and landing of the fish in the usual manner.

Still another object of the present invention is to provide a holder of the character above described which may be inexpensively manufactured and assembled with a few rugged parts capable of long and trouble-free service.

The invention possesses other objects and features of advantage, some of which with the foregoing will be set forth in the following description of the preferred form of the invention which is illustrated in the drawings accompanying and forming part of this specification. It is to be understood, however, that variations in the showing made by the said drawings and description may be adopted within the scope of the invention.

Referring to said drawings:

FIG. 1 is a side elevation of a fishing rod holder embodying the present invention, retaining a fishing rod, reel and line, with dotted lines indicating the operative movement of the several parts.

FIG. 2 is an enlarged side elevation of the fishing rod holder with certain of the parts rotated relative to their position inn FIG. 1.

FIG. 3 is a side elevation of the holder taken from the opposite side of the device as seen in FIG. 2.

FIG. 4 is an exploded perspective view of a portion of the holder.

FIG. 5 is a cross-sectional view on a further enlarged scale taken substantially on the plane of line 5—5 of FIG. 3.

FIG. 6 is a front elevation of a modified form of mounting means for the holder.

FIG. 7 is a cross-sectional view taken substantially upon the plane of line 7—7 of FIG. 6.

The fishing rod holder of the present invention consists briefly of a helix 11 formed of resilient material and having an open end 12 and an interior chamber 13 dimensioned for receipt and support of the butt 14 of a fishing rod 16; the opposite end 17 of the helix being formed to provide a stop across chamber 13 to support the interior end 18 of butt 14 and having an end portion 19 extending in an axial direction therefrom; a first manually actuated clamp means 21 secured to end portion 19 and having pivotally attached sections 22 and 23 for selectively positioning helix 11 in a plane; second manually actuated clamp means 27 comprising section 22 and and a third section 28 pivotally attached thereto for selectively positioning helix 11 in a plane substantially perpendicular to the plane of clamp means 21; and quick detachable mounting means 31 secured to section 28 for selectively stationing the holder for and during fishing.

Helix 11 is preferably formed of steel wire with relatively open coils for nesting of butt end 18 when partially withdrawn from the helix; and preferably the wire is covered with a soft rubber or plastic coating to increase its rod retention ability.

Clamp section 23 is formed with a central opening 32 which is positioned in registration with opening 33 in section 22 for receipt of an eyebolt 34, the latter having an enlarged head 36 with an opening 37 therethrough dimensioned for receipt of spring end 19, and with a threaded shank dimensioned for mounting through openings 32 and 33 for attachment to a wingnut 41 at the opposite side of section 22 for clamping the assembly together. The side of section 23 confronting spring end 19 is here formed with diametrically opposed shoulders 43 and 44 for locking against rotation head 36 therebetween and are formed with diametrically aligned recesses 46 and 47 for receiving and anchoring therein the free end portion 19 of the helix. Accordingly, the helix may be rotated conjointly with section 23 and locked in adjusted position by tightening of wingnut 41 on the threaded end portion of eyebolt 34. As will be observed from FIG. 4, sections 22 and 23 are formed with opposed planar mating surfaces 48 and 49 which define the plane of rotational adjustment of the helix by the clamping means 21 and which in the present construction is designed to be a substantially vertical plane. If desired, a series of circumferentially spaced tongues and grooves 51 and 52 may be provided on surfaces 48 and 49 for positively locking section 23 in adjusted position.

Mounting means 31 is preferably in the form of a C-clamp having spaced-apart flanges 53 and 54 connected by a leg 55. Flange 53 is formed with a planar surface 56 which is adapted to mate with a flat underside 57 of a flange portion 58 formed on section 22 substantially perpendicular to the plane of surface 48; flange portion 58 being supported by spaced arms 61 and 62 connecting the portions of section 22 providing surfaces 48 and 57, arms 61 and 62 also defining an open center for the section. In the present construction flange 53 is provided with a centrally positioned and axially extending threaded stud 63 which is dimensioned for threading through a central opening 64 in flange 58 for connection with a wingnut 66 mounted within the open portion of section 22 between arms 61 and 62. A washer 67 may be mounted under wingnut 66 for bearing against the upper side of flange 58. If desired, and as here shown, the opposed surfaces 56 and 57 may be formed with interfitting tongue and groove portions 68 and 69 to lock the parts in adjusted position. A clamping bolt 71 is threaded through flange 54 and is provided with an end bearing part 72 movable to and from the underside of flange 53 for clamping therebetween a supporting member such as the rail of a boat, or the like, or moved along the rail fore-and-aft of the fishing boat as desired during fishing.

A modified form of the invention is illustrated in FIGS. 6 and 7 wherein the quick detachable mounting means for the rod holders is in the form of a ground spike 76. As here shown the ground spike is formed of sheet metal having angularly related sides 77 and 78 tapered to a point 79 at one end for insertion into the ground and being folded together at its opposite end to provide a flat top section 81 corresponding with the flat top portion of section 22. Section 81 is here provided with an opening therethrough for receipt of eyebolt 34 carried by section 23 bearing against one side of section 81. Wingnut 41 and washer 82 are mounted on the eyebolt and bear against the opposite side of section 81 so as to clamp end portion 19 and helix 11 in desired rotational adjustment.

If desired, and as here shown, the ground spike 76 may be formed of two sections 83 and 84 which are slidably attached and held in attached position by a surrounding bracket collar 86 secured to section 84 and cooperating therewith to provide channels for slidably receiving the angularly related sides 77 and 78 of section 83, the tapered form of the sections and collar providing a wedge fit for the parts in assembled position.

I claim:

1. A fishing rod holder formed as a helix and adapted for receiving the butt of a fishing rod, the improvement comprising:

a helix formed of resilient material and having an open end and an interior chamber dimensioned for receipt of said butt over the full length of said chamber, the opposite end of said helix extending across said chamber to provide a stop for supporting the interior of said butt, said stop having an end portion extending in an axial direction from said interior chamber, said end being formed and dimensioned to provide a rim edge comprising pivotally attached sections, said end portion being secured to one of said sections, said pivotally attached sections providing for selective positioning of said helix in a plane, and quick detachable mounting means secured to said clamp means for selectively stationing said holder for and during fishing.

2. A fishing rod holder as defined in claim 1, second manually actuated clamp means comprising one of said pivotally attached sections and a third section pivotally attached thereto for selectively positioning said helix in a plane substantially perpendicular to said first plane, said quick detachable mounting means being secured to said third section.

3. A fishing rod holder as defined in claim 2, said sections having pairs of opposed planar mating surfaces defining said planes, and said mounting means normally disposing said surfaces and planes in a vertical and horizontal orientation.

4. A fishing rod holder as defined in claim 3, wherein said mounting means comprises a C-clamp.

5. A fishing rod holder as defined in claim 1, wherein said mounting means comprises a ground spike.

UNITED STATES PATENT OFFICE
CERTIFICATE OF CORRECTION

Patent No. 3,612,454          Dated October 12, 1971

Inventor(s) FRANK F. LINN

It is certified that error appears in the above-identified patent and that said Letters Patent are hereby corrected as shown below:

Column 2, line 73, Claim 1, after "interior", insert --end--; line 75, after "chamber, said", insert --open--.

Signed and sealed this 25th day of April 1972.

(SEAL)
Attest:

EDWARD M. FLETCHER, JR.          ROBERT GOTTSCHALK
Attesting Officer                Commissioner of Patents

UNITED STATES PATENT OFFICE
CERTIFICATE OF CORRECTION

Patent No. 3,612,454                     Dated  October 12, 1971

Inventor(s)  FRANK F. LINN

It is certified that error appears in the above-identified patent and that said Letters Patent are hereby corrected as shown below:

Column 3, line 1, Claim 1, after "edge", insert -- support for said butt, manually actuated clamp means--.

Signed and sealed this 21st day of Ma. 1974.

(SEAL)
Attest:

EDWARD M. FLETCHER, JR.                C. MARSHALL DANN
Attesting Officer                       Commissioner of Patents